US011485333B2

United States Patent
Werner et al.

(10) Patent No.: US 11,485,333 B2
(45) Date of Patent: Nov. 1, 2022

(54) DIAPHRAGM VALVE WITHOUT A SUPPORTING RING AND WITHOUT A SUPPORTING PLATE

(71) Applicant: KNORR-BREMSE SYSTEME FUER NUTZFAHRZEUGE GMBH, Munich (DE)

(72) Inventors: Kai Werner, Ludwigsburg (DE); Jan Grebe, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 370 days.

(21) Appl. No.: 16/496,819

(22) PCT Filed: Mar. 20, 2018

(86) PCT No.: PCT/EP2018/056977
§ 371 (c)(1),
(2) Date: Sep. 23, 2019

(87) PCT Pub. No.: WO2018/177801
PCT Pub. Date: Oct. 4, 2018

(65) Prior Publication Data
US 2020/0282966 A1 Sep. 10, 2020

(30) Foreign Application Priority Data

Mar. 27, 2017 (DE) .......................... 102017106555.5

(51) Int. Cl.
*B60T 8/36* (2006.01)
*B60T 8/48* (2006.01)
(Continued)

(52) U.S. Cl.
CPC ............ *B60T 8/3605* (2013.01); *B60T 8/176* (2013.01); *B60T 8/268* (2013.01); *B60T 8/3615* (2013.01);
(Continued)

(58) Field of Classification Search
CPC ... B60G 2800/92; B60T 8/3605; B60T 8/268; B60T 8/3615; B60T 8/4818
See application file for complete search history.

(56) References Cited

U.S. PATENT DOCUMENTS

| | | | |
|---|---|---|---|
| 5,733,018 A * | 3/1998 | Goebels | B60T 8/3605 |
| | | | 303/118.1 |
| 6,164,312 A | 12/2000 | Bostedo et al. | |
| 7,762,796 B2 | 7/2010 | Hargraves et al. | |

FOREIGN PATENT DOCUMENTS

| | | |
|---|---|---|
| CN | 102066170 A | 5/2011 |
| CN | 205971278 U | 2/2017 |

(Continued)

OTHER PUBLICATIONS

English machine translation for DE-102010007407 A1 (Year: 2011).*

(Continued)

*Primary Examiner* — Melody M Burch
(74) *Attorney, Agent, or Firm* — Norton Rose Fulbright US LLP; Gerard Messina

(57) ABSTRACT

A diaphragm valve (DV), includes: an elastomer-diaphragm (ED) in/on a valve-housing via a radially-outer-edge-bead and interacts with a DV-seat (DVS); a first-control-chamber (CC), delimited by a first-surface, facing away from the DVS, of the ED and loadable and relieved of load by a pressure-medium (PM), and when the first-CC is loaded, the ED is pushed against the DVS; a second-CC, delimited by a second-surface, facing away from the first-surface, of the ED and loadable and relieved of load and surrounds the DVS, and, when the second-CC is loaded by PM, the ED lifts off from the DVS and the second-CC is connected to a PM-flow-channel (FC), on which the DVS is formed at an end-side; and the PM-FC, DVS, ED are coaxial as to an axial-direction, and the smallest thickness of the ED's central-region, as to a radial-direction perpendicular to the axial-direction, is at least 30% of the PM-FC's inner-diameter.

13 Claims, 4 Drawing Sheets

(51) Int. Cl.
    *B60T 8/176*     (2006.01)
    *B60T 8/26*     (2006.01)

(52) U.S. Cl.
    CPC ........ B60T 8/4818 (2013.01); *B60G 2800/92* (2013.01)

(56) References Cited

FOREIGN PATENT DOCUMENTS

| | | | | |
|---|---|---|---|---|
| DE | 2232664 A1 | 1/1974 | | |
| DE | 19918070 A1 | 12/1999 | | |
| DE | 102008035372 A1 | 7/2008 | | |
| DE | 102008028439 B3 | 10/2009 | | |
| DE | 102010007407 A1 | 8/2011 | | |
| EP | 0154214 A2 * | 9/1985 | ............ | B60T 8/3605 |
| EP | 3352522 A1 | 1/1990 | | |
| JP | 62167965 U * | 10/1987 | | |
| JP | 08268255 A * | 10/1996 | ............ | B60T 8/3605 |
| JP | 11048931 A * | 2/1999 | ............ | B60T 8/3605 |
| JP | 11157432 A * | 6/1999 | ............ | B60T 8/3605 |
| WO | 33043863 A1 | 5/2003 | | |
| WO | 2010012425 A1 | 2/2010 | | |
| WO | WO-2013008010 A1 * | 1/2013 | ............. | F16K 25/00 |

OTHER PUBLICATIONS

International Search Report dated Jun. 19, 2018, of the corresponding International Application PCT/EP2018/056977 filed Mar. 20, 2018.

* cited by examiner

DIAPHRAGM VALVE WITHOUT A SUPPORTING RING AND WITHOUT A SUPPORTING PLATE

FIELD OF THE INVENTION

The present invention relates to a diaphragm valve having at least the following: an elastomer diaphragm, which is held in or on a valve housing via a radially outer edge bead and interacts with a diaphragm valve seat, a first control chamber, which is delimited by a first surface, facing away from the diaphragm valve seat, of the elastomer diaphragm and is able to be loaded and relieved of load by pressure medium, wherein, when the first control chamber is loaded by pressure medium, the elastomer diaphragm is pushed against the diaphragm valve seat, a second control chamber, which is delimited by a second surface, facing away from the first surface, of the elastomer diaphragm and is able to be loaded and relieved of load by pressure medium and surrounds the diaphragm valve seat, wherein, when the second control chamber is loaded by pressure medium, the elastomer diaphragm has the tendency to lift off from the diaphragm valve seat and in the process the second control chamber is connected to a pressure medium flow channel, on which the diaphragm valve seat is formed at an end side, and wherein the pressure medium flow channel, the diaphragm valve seat and the elastomer diaphragm are arranged in a manner coaxial with one another with respect to an axial direction.

The present invention also relates to a pressure control valve arrangement for controlling the fluid pressure in a pressure medium-actuated and slip-regulated brake system of a vehicle that comprises such a diaphragm valve, and to a slip-regulated pressure medium-actuated brake system of a vehicle having at least such a pressure control valve device.

BACKGROUND INFORMATION

Brake slip-regulated brake systems such as ABS (anti-locking braking system) prevent the wheels from locking, and perform their function if greater traction is demanded between a tire and the roadway than can be transmitted, that is to say if the driver overbrakes. In the event of overbraking, the central electronic control unit of the ABS brake system detects, from rotational speed sensor signals, the tendency of one or more wheels to lock, and from this calculates the activation of the pressure control valve arrangement acting on the associated brake cylinder. The brake pressure is then adjusted to an optimum level of slip by the pressure control valve arrangement by being reduced, held or increased according to the wheel behavior and thus to the friction conditions between the tire and the roadway. ABS pressure control valve arrangements are used in vehicles such as for example utility vehicles, omnibuses, semitrailer tractors and also in trailers. Pressure control valve arrangements without a relay action generally have 3/2 directional control solenoid valves as pilot control valves of diaphragm valves, wherein an electronic control device activates the 3/2 directional control solenoid valves so as to be able to carry out the functions—holding of pressure, reduction of pressure and increase of pressure—required for ABS operation. During a braking operation without ABS response (no tendency of a wheel to lock), the pressure medium, usually air, flows through the pressure control valve arrangements unhindered in both directions during the aeration and deaeration of the brake cylinders. This ensures that the function of the service brake system is not influenced by the ABS pressure control valve arrangement.

Pressure control valves as 1-channel pressure control valves for anti-lock systems of motor vehicles have, within the housing, in each case one diaphragm valve as an inlet or holding valve and as an outlet valve, and in each case one electromagnetic control valve for the diaphragm holding valve and the diaphragm outlet valve. The two diaphragm valves comprise in each case one diaphragm which is able to be acted on by the pressure in a pilot control chamber, and the electromagnetic control valves comprise in each case one magnet armature which is able to be actuated by an electric magnet coil and which interacts with in each case two solenoid valve seats. In the "holding of pressure" operating mode, that is to say if the intention is to maintain the brake pressure just set by the pressure control valve arrangement, the magnet coil of the electromagnetic pilot control valve associated with the diaphragm holding valve is electrically energized, whereby the magnet armature of the pilot control valve is pushed sealingly against the associated solenoid valve seat counter to the action of the spring device or arrangement.

A generic diaphragm valve and a generic pressure control valve arrangement are discussed for example in DE 10 2008 035 372 A1. The diaphragm valve from DE 10 2008 035 372 A1 typically has a metal support ring, which supports the elastomer diaphragm in a radially outer region, and has an integrated support plate composed of metal which supports the elastomer diaphragm in its central region, which central region interacts with a valve seat. The support ring and the support plate extend the service life of the elastomer diaphragm.

SUMMARY OF THE INVENTION

By contrast to this, the present invention is based on the object of further developing a diaphragm valve of the type described above such that it can be produced as expediently as possible while having long service life. Also, the intention is to provide a pressure control valve arrangement comprising such a diaphragm valve for a slip-regulated brake system of a vehicle, and a slip-regulated brake system of a vehicle having at least such a pressure control valve arrangement.

According to the invention, said object is achieved by the features described herein.

The invention is based on a diaphragm valve having at least the following: an elastomer diaphragm, which is held in or on a valve housing via a radially outer edge bead and interacts with a diaphragm valve seat, a first control chamber, which is delimited by a first surface, facing away from the diaphragm valve seat, of the elastomer diaphragm and is able to be loaded and relieved of load by pressure medium, wherein, when the first control chamber is loaded by pressure medium, the elastomer diaphragm is pushed against the diaphragm valve seat, a second control chamber, which is delimited by a second surface, facing away from the first surface, of the elastomer diaphragm and is able to be loaded and relieved of load by pressure medium and, as seen in the circumferential direction, surrounds for example a pressure medium flow channel and/or the diaphragm valve seat, wherein, when the second control chamber is loaded by pressure medium, the elastomer diaphragm has the tendency to lift off from the diaphragm valve seat and in the process the second control chamber is connected to the pressure medium flow channel, on which the diaphragm valve seat is formed at an end side, and wherein the pressure medium flow channel, the diaphragm valve seat and the elastomer diaphragm are arranged in a manner coaxial with one another with respect to an axial direction. Here, the axial direction also constitutes an actuation direction of the elastomer diaphragm, for lifting the latter off from the diaphragm valve seat for example. Elastomer diaphragm means that the diaphragm is produced at least partially and which may be completely from an elastomer.

According to the invention, it is then provided that an inner diameter of the pressure medium channel is 7.5 mm to 9.5 mm, and the Shore hardness of the elastomer diaphragm is at least 40 Shore A, and the smallest thickness of the elastomer diaphragm, at least in a central region, which, as seen in relation to a radial direction perpendicular to the axial direction, is situated within the diaphragm valve seat, is at least 30% of the inner diameter of the pressure medium channel.

The applicant of the present patent application has found out that then, on the one hand, the stiffness in relation to material and shape of the elastomer diaphragm, in particular in the region which, as seen in relation to a radial direction perpendicular to the axial direction, is situated within the diaphragm valve seat, is high enough, and on the other hand, the inner diameter of the pressure medium flow channel is small enough, that, under the normal pressure conditions for pressure control valve arrangements, the elastomer diaphragm does not buckle, or break, into the pressure medium flow channel. However, in the radially outer region of the elastomer diaphragm too, owing to the relatively high stiffness of the elastomer material, a stiffness of such a magnitude is provided that the elastomer diaphragm neither breaks nor buckles there. In this way, a high service life and also a high level of functional reliability of the elastomer diaphragm are ensured.

With the measures according to the invention, it is in particular possible for the elastomer diaphragm of the diaphragm valve to be formed without an additional support ring, of which provision is made for supporting a radially outer region of the elastomer diaphragm, and/or without an additional support plate, integrated in the central region of the elastomer diaphragm, wherein the support ring and the support plate are produced from a material which differs from an elastomer and for example from a metal, as is described for example in the aforementioned DE 10 2008 035 372 A1. In particular, the diaphragm valve is then formed without such a support ring and/or without such a support plate according to an exemplary embodiment. This results in a considerable reduction in the manufacturing costs of the diaphragm valve.

Advantageous refinements of and improvements to the invention are possible by the measures specified in the further descriptions herein.

According to an exemplary embodiment, provision is made of the spring device or arrangement which pushes the central region of the diaphragm against the diaphragm valve seat as a result of spring forces. The spring device may be configured such that they push the central region of the elastomer diaphragm against the diaphragm valve seat with a relatively small force, which is just sufficient to define a starting state and a starting position of the elastomer diaphragm, if no actuation by the pressure medium is present.

The pressure medium may be formed by compressed air or by hydraulic fluid.

According to one refinement, the first control chamber and the second control chamber are additionally delimited by the valve housing, in particular the first control chamber is delimited by a valve housing main body and/or a valve cover and the second control chamber is delimited by the valve housing main body.

The invention also relates to a pressure control valve arrangement for controlling the fluid pressure in a pressure medium-actuated and slip-regulated brake system of a vehicle, wherein, during the slip regulation, the brake pressure is increased, held or reduced in at least one brake cylinder, wherein two diaphragm valves, a holding or inlet diaphragm valve and an outlet diaphragm valve, and also two electromagnetic pilot control valves which are able to be activated by an electronic control device and which serve for the pilot control of the diaphragm valves are provided in a housing of the pressure control valve arrangement, wherein the holding or inlet diaphragm valve, in an open position, passes pressure medium through into the at least one brake cylinder and, in a closed position, prevents pressure medium being fed into the at least one brake cylinder, and wherein the outlet diaphragm valve, in an open position, connects the at least one brake cylinder to a pressure sink and, in a closed position, blocks the connection between the at least one brake cylinder and the pressure sink.

Of the holding or inlet diaphragm valve and the outlet diaphragm valve, at least the holding or inlet diaphragm valve is then formed by a diaphragm valve described above. Additionally, the outlet diaphragm valve may also be formed by an above-described diaphragm valve.

For the case in which the holding or inlet diaphragm valve of the pressure control valve arrangement is formed by an above-described diaphragm valve, it may be provided that the first control chamber of the holding or inlet diaphragm valve is connected to an output of an electromagnetic pilot control valve, which forms an inlet pilot control valve, and that the second control chamber of the holding or inlet diaphragm valve is connected to a pneumatic channel of a service brake valve, and the pressure medium flow channel of the holding or inlet diaphragm valve is connected to at least one pressure medium-actuated brake cylinder.

For the case in which the outlet diaphragm valve of the pressure control valve arrangement is formed by an above-described diaphragm valve, it may be provided that the first control chamber of the outlet diaphragm valve is connected to an output of an electromagnetic pilot control valve, which forms an outlet pilot control valve, and that the second control chamber of the outlet diaphragm valve is connected to at least one pressure medium-actuated brake cylinder, and the pressure medium flow channel of the outlet diaphragm valve is connected to a pressure sink or to a pressure medium reservoir.

According to one refinement, the two electromagnetic pilot control valves may have in each case one magnet coil and magnet armatures which interact with solenoid valve seats and which are able to be actuated counter to the spring device or arrangement by electrical energization of the magnet coils.

Furthermore, the invention also comprises a slip-regulated, pressure medium-actuated brake system of a vehicle, having at least one pressure control valve device described above, in particular a brake slip-regulated brake system, wherein, during the slip regulation, the brake pressure is increased, held or reduced in at least one brake cylinder. In other words, the invention in particular also comprises a brake slip-regulated, pressure medium-actuated brake system of a vehicle, wherein the brake slip regulation is formed by an ABS system or an anti-skid device.

Below, an exemplary embodiment of the invention is illustrated in the drawing and is discussed in more detail in the following description.

BRIEF DESCRIPTION OF THE DRAWINGS

FIG. 3 shows an enlarged illustration of a diaphragm valve of the pressure control valve arrangement in FIG. 2a.

DETAILED DESCRIPTION

Figure 1:
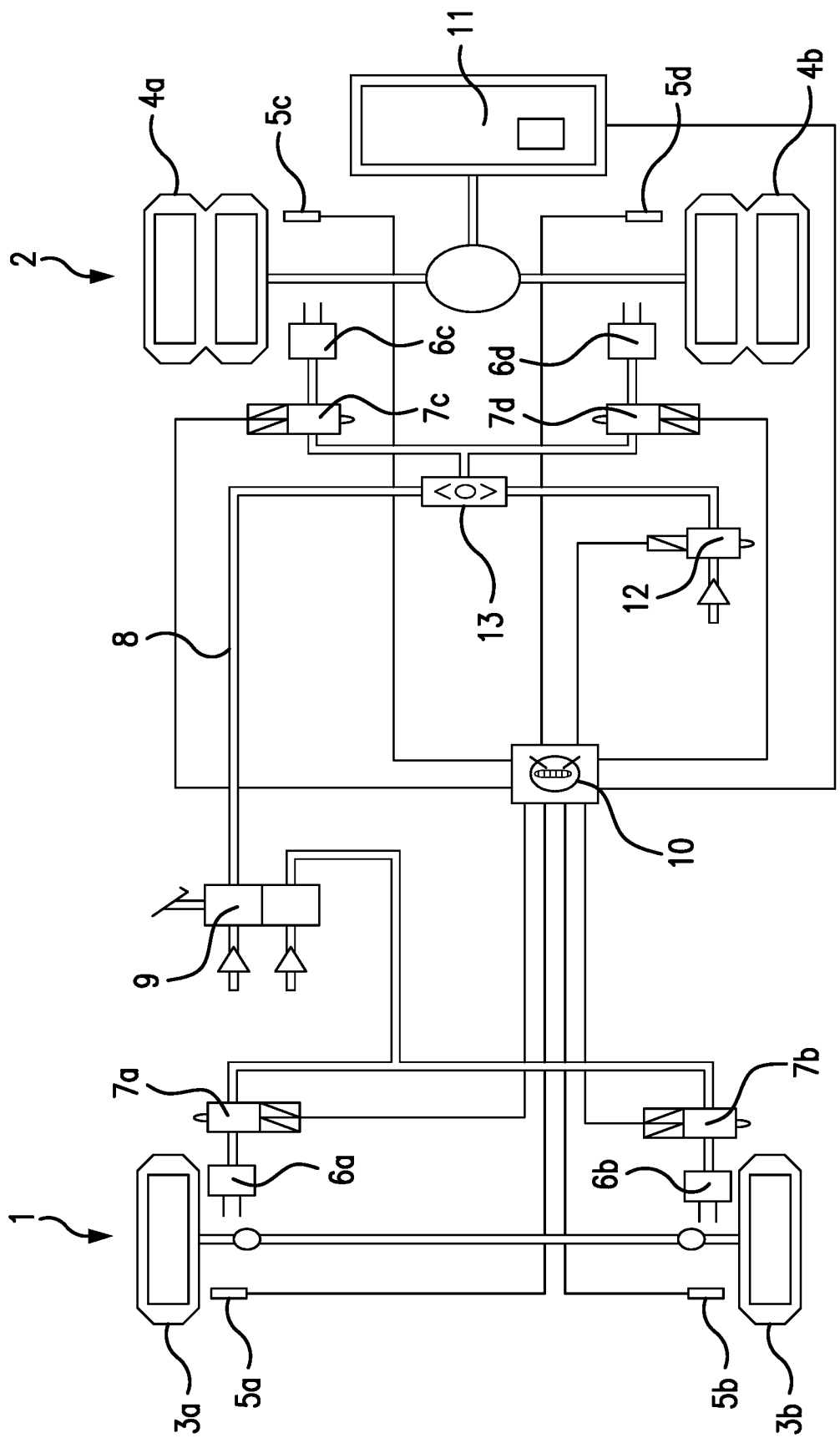
FIG. 1 shows a basic illustration of an ABS brake system as a general schematic diagram of a 4S/4C ABS brake system of a vehicle.

According to FIG. 1, a vehicle equipped with an ABS brake system has a front axle 1 and a rear axle 2. Wheels 3a and 3b are arranged on the front axle 1; the rear axle 2 has for example wheels 4a and 4b which are each equipped with twin tires. The ABS brake system which serves for braking said wheels 3a, 3b and 4a, 4b is configured here in the form of a 4S/4C system (four sensors, four channels). This means that, here, a total of four rotational speed sensors 5a-5d and four pressure control valve arrangements 7a-7d are provided. The pressure control valve arrangements 7a-7d serve for actuating respectively associated brake cylinders 6a-6d. All the pressure control valve arrangements 7a-7d are connected to a foot brake valve 9 via a branching pneumatic brake pressure line 8.

The driver, when actuating the foot brake valve 9, generates a brake pressure which is transmitted via the pneumatic brake pressure line 8 to the brake cylinders 6a-6d associated with the wheels 3a, 3b and the wheels 4a, 4b so as to pass through the pressure control valve arrangements 7a-7d.

Figure 2A:
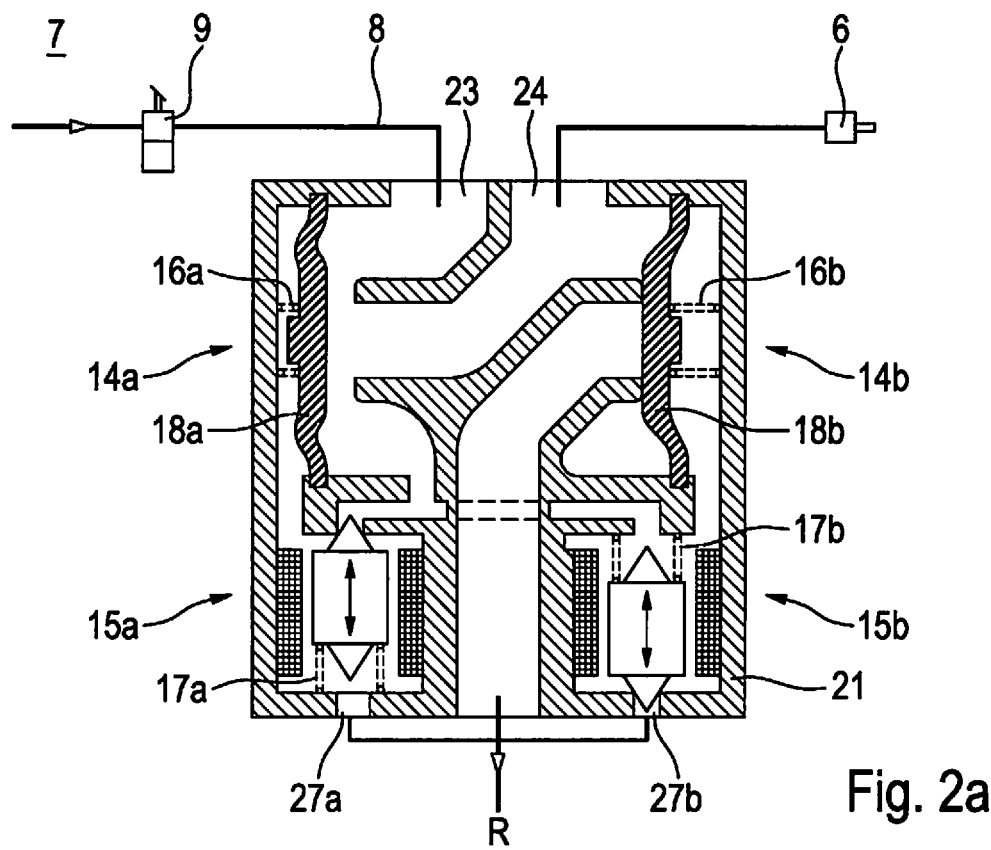
FIG. 2a shows a schematic illustration of a pressure control valve arrangement, which activates a brake cylinder, in the increase of pressure state.
Figure 2B:
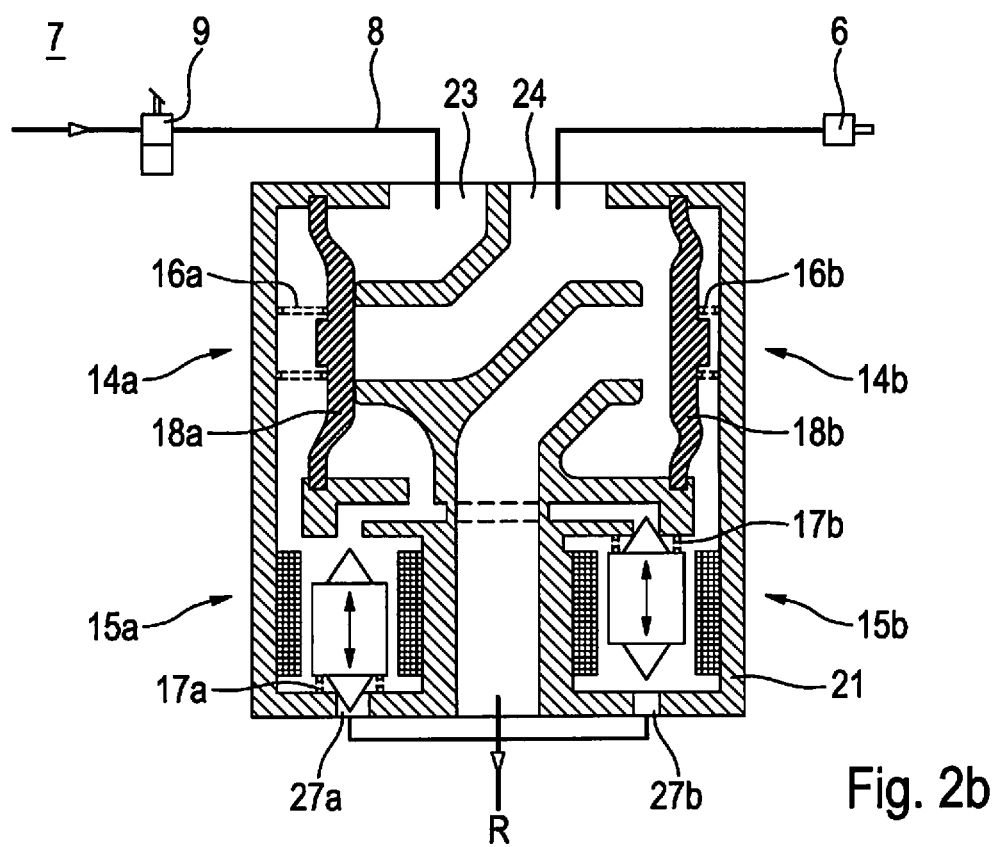
FIG. 2b shows a schematic illustration of the pressure control valve arrangement in FIG. 2a in the reduction of pressure state.
Figure 2C:
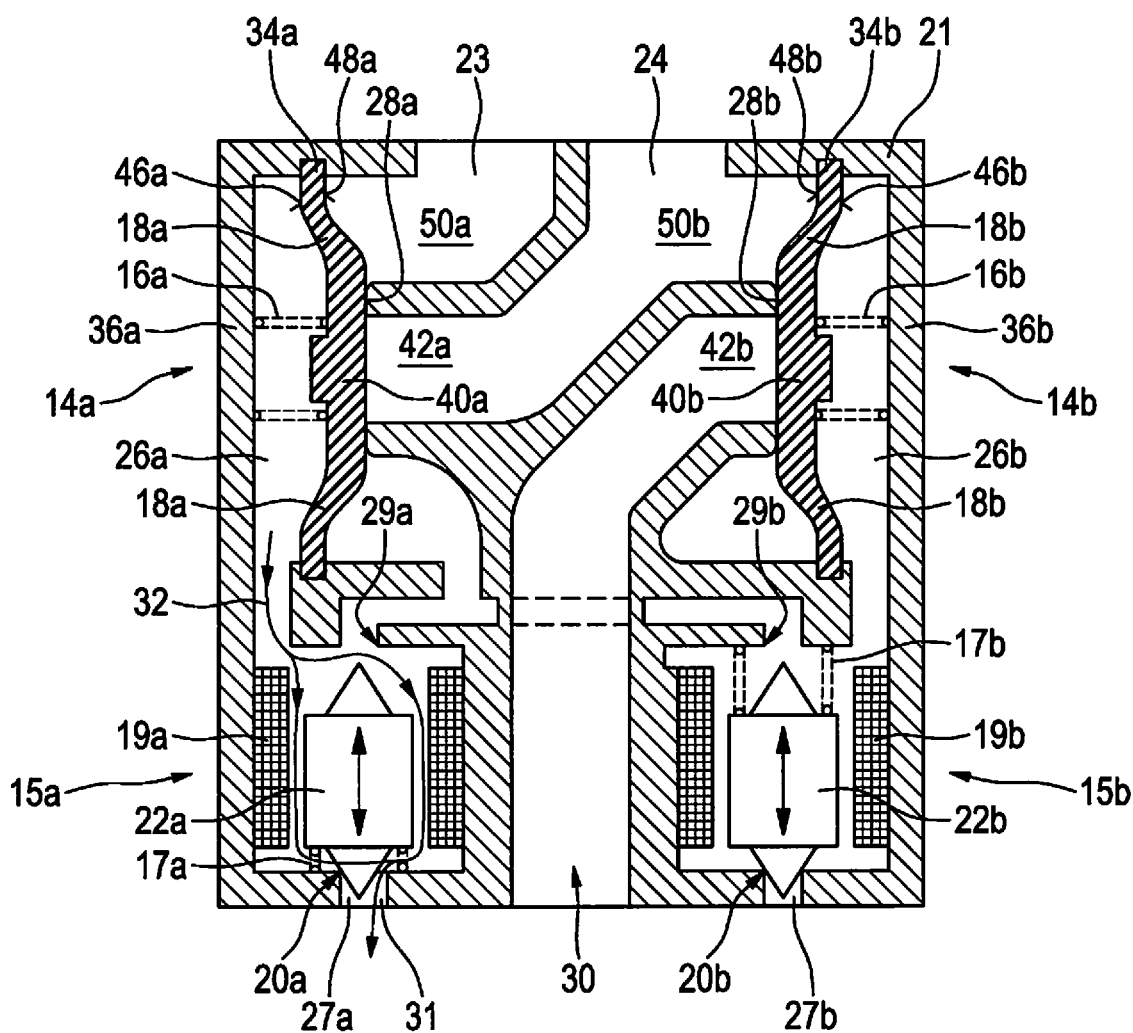
FIG. 2c shows a schematic illustration of the pressure control valve arrangement in FIG. 2a in the holding of pressure state.

The pressure control valve arrangements 7a-7d are able to be activated via integrated electromagnetic valves 15a, 15b, which are shown in FIG. 2a, FIG. 2b and FIG. 2c, and for this purpose are electrically connected to a central electronic control unit, in particular to an ABS control device 10.

On the input side, the electronic control unit 10 is connected to the four rotational speed sensors 5a-5b which determine the wheel speeds. In the event of locking of a wheel 3a-3d, that is to say in the event of an optimum brake slip being exceeded, the brake pressure input by the driver via the foot brake valve 9 is reduced, according to an ABS regulating process and to the electronic control unit 10, by the corresponding pressure control valve arrangement 7a-7d until the locking is eliminated. The ABS brake system of the present exemplary embodiment furthermore comprises an ASR function, which comprises an ASR unit 11 for reducing the engine torque and also an ASR solenoid valve 12 and a shuttle valve 13.

The pressure control valve arrangement 7 used according to FIG. 2a within the ABS brake system for the purpose of ABS regulation is constructed here in the form of a 1-channel pressure control valve arrangement and consists substantially of two integrated diaphragm valves 14a and 14b and two electromagnetic valves 15a, 15b which activate said diaphragm valves and which are preloaded by spring elements 17a, 17b in one of two closing directions. Elastomer diaphragms 18a, 18b of the diaphragm valves 14a and 14b are in each case loaded in the closing direction by spring elements 16a, 16b and are pilot-controlled via the respectively associated electromagnetic valves 15a and 15b. Of the diaphragm valves 14a, 14b, one is a holding or inlet diaphragm valve 14a and the other is an outlet diaphragm valve 14b.

A housing 21 of the pressure control valve arrangement 7 furthermore has a pressure medium port 23 for the application of pressure to and/or release of pressure from the pressure control valve arrangement 7, and an in working port 24 for the connection of the brake cylinder 6. The pressure medium port 23 is, as shown in FIG. 2a to FIG. 2c, connected to a pneumatic channel of the foot or service brake valve 9 of the pressure medium-actuated brake device via the brake pressure line 8 and is aerated or deaerated according to an actuation of the foot brake valve 9.

As can be seen in detail most clearly from FIG. 2c, the two electromagnetic valves 15a, 15b each have a magnet coil 19a, 19b, wherein, by electrical energization of the magnet coils 19a, 19b, magnet armatures 22a, 22b, as valve closure members, which interact with solenoid valve seats 20a, 20b or 29a, 29b of the electromagnetic valves 15a, 15b, are actuated. Here, the magnet armatures 22a, 22b interact, according to switch position, with in each case two solenoid valve seats 20a, 20b or 29a, 29b.

Here, the magnet armatures 22a, 22b are, as a result of the preloading by the spring device or arrangement 17a, 17b, pressed against the upper solenoid valve seats 29a, 29b in the electrically deenergized state of the magnet coils 19a, 19b. The spring device or arrangement 17a, 17b then preload the magnet armature 22a in particular into a position lifted off from the lower solenoid valve seat 20a, in which position a flow cross section is opened up and brings a chamber 26a formed in the housing 21 into connection with a pressure sink 27a in the form of a deaeration port. During the electrical energization of the magnet coils 19a, 19b, the magnet armatures 22a, 22b are pushed against the lower solenoid valve seats 20a, 20b counter to the action of the spring device or arrangement 17a, 17b.

The chamber 26a is connected to the pressure medium port 23 and thus to the foot brake valve 9 if the elastomer diaphragm 18a of the holding or inlet diaphragm valve 14a lifts off from its associated diaphragm valve seat 28a. The working port 24 and thus the brake cylinder 6 come into connection with a further pressure sink 30 if the elastomer diaphragm 18b of the outlet diaphragm valve 14b lifts off from its associated diaphragm valve seat 28b.

The pressure control valve arrangement 7 is shown in FIG. 2a in its open position, in which a build-up of pressure to the connected brake cylinder 6 is realized (increase of pressure). In this case, neither of the electromagnetic valves 15a and 15b is electrically activated. In the position shown, the compressed air coming from the foot brake valve 9 pushes open the holding or inlet diaphragm valve 14a, that is to say, owing to the brake pressure, from the port 23, prevailing at the right-hand effective surface of the elastomer diaphragm 18a, said diaphragm is lifted off from the diaphragm valve seat 28a counter to the action of the spring device or arrangement 16a. Owing to the electromagnetic valve 15a, which is closed against the upper solenoid valve seat 29a in its spring-loaded home position, the closure again of the associated holding or inlet diaphragm valve 14a is prevented. Owing to the second electromagnetic valve 15b, which is open in its spring-loaded home position, the brake pressure coming from the foot brake valve 9 prevails at the diaphragm 18b of the outlet diaphragm valve 14b from the right and pushes said diaphragm against its diaphragm valve seat 28b, whereby the outlet diaphragm valve 14b remains closed off. The compressed air, which is under brake pressure, thus passes unhindered through the pressure control valve arrangement 7. The pressure control valve arrangement 7 is also in this state, in which the compressed air is passed through, when no ABS regulation is being realized.

Starting from the state shown in FIG. 2a (increase of pressure), for the purpose of holding the brake pressure in a brake cylinder 6a to 6d constant (holding of pressure), according to FIG. 2c, it is necessary merely to electrically energize the magnet coil 19a of the electromagnetic valve 15a.

By contrast, the electromagnetic valve 15b remains electrically deenergized, whereby the outlet-side diaphragm valve 14b continues to remain closed. Electrical energization of the magnet coil 19a of the electromagnetic valve 15a results in the magnet armature 22a of the latter lifting off from the upper solenoid valve seat 29a counter to the action of the spring device or arrangement 17a and pushing against the lower solenoid valve seat 20a. The brake pressure led from the foot brake valve 9 via the initially still open holding or inlet diaphragm valve 14a then prevails in a first control chamber 26a formed in the housing 21 and can act on the elastomer diaphragm 18a, according to FIG. 2c, from the left-hand side too. The pressure is then equal on the right-hand surface 48a and left-hand surface 46a of the elastomer diaphragm 18a of the holding or inlet diaphragm valve 14a. However, since the first or left-hand surface 46a of the elastomer diaphragm 18a is larger, the holding or inlet diaphragm valve 14a is closed, that is to say the elastomer diaphragm 18a is pushed against the diaphragm valve seat 28a. For the purpose of keeping the pressure constant, the pressure control valve arrangement 7 therefore closes off the pneumatic brake pressure line 8 running from the foot brake valve 9 to the brake cylinder 6.

Here, however, the brake pressure led from the foot brake valve 9 still prevails in the then closed first control chamber 26a. In the region of the lower solenoid valve seat 20a, against which the magnet armature 22a of the electromagnetic valve 15a is pushed in the electrically energized state of the magnet coil 22a, there is formed for example a bypass channel 31 through which a compressed air flow can flow to the pressure sink 27a from the first control chamber 26a along at least one part of the magnet coil 19a of the electromagnetic valve 15a associated with the diaphragm holding valve 14a. Said compressed air flow can then cool the magnet coil 19a undergoing electrical energization.

The bypass channel 31 bypasses the flow cross section closed off by the magnet armature 22a, which bears sealingly against the solenoid valve seat 20a, and allows a compressed air flow along at least one part of the magnet coil 19a, which may be along the entire longitudinal extent thereof and parallel thereto, as is indicated by the arrow 32 in FIG. 2c.

On the other hand, the bypass channel 31 is formed, in particular with respect to its cross section, such that the volume flow of the compressed air flow through the bypass channel 31 is smaller than an upper limit volume flow by which the holding diaphragm valve 14a could be switched from its closed position back into its open position. The reason for this is that, as a result of the compressed air flowing through the bypass channel 31 and to the pressure sink 27a, the pressure in the first control chamber 26a, and thus also the pressure on the left-hand or first surface 46a of the elastomer diaphragm 18a of the holding or inlet diaphragm valve 14a, drops. As a result, the volume flow of the bypass flow is prevented from becoming of such a size that it is capable of influencing the (switching) state of the holding or inlet diaphragm valve 14a. The reason for this is that the volume flow of the bypass flow flowing through the bypass channel 31 is intended to serve exclusively for cooling the magnet coil 19a. The bypass channel 31 may be formed on the periphery of the solenoid valve seat 20a and parallel to the central axis of the magnet armature 22a or to the coil 19a and, despite the magnet armature 36a, which seals against the solenoid valve seat 20a, leaves a certain flow cross section open. It is however alternatively also possible to dispense with such a bypass channel 31.

According to FIG. 2b, a pressure release (pressure reduction) in the brake cylinder 6 is achieved in that both electromagnetic valves 15a and 15b are electrically energized. The above description with regard to the holding of pressure applies to the electromagnetic valve 15a and the associated holding or inlet diaphragm valve 15a. By contrast, the magnet armature 22b of the other electromagnetic valve 15b is, owing to the electrical energization of the magnet coil 19b of the latter, lifted off from the lower solenoid valve seat 20b counter to the action of the spring device or arrangement 17b and pushed against the upper solenoid valve seat 29b. The pressure in the chamber 26b therefore drops such that the pressure coming from the brake cylinder 6 can lift the diaphragm 18b of the outlet diaphragm valve 14b off from the diaphragm valve seat 28b such that the working port 24, and thus the brake cylinder 6, for deaeration, is connected to the pressure sink 30 or to a pressure medium reservoir R.

In summary, it is thus the case that the holding or inlet diaphragm valve 14a, in an open position (FIG. 2a), passes pressure medium through into the brake cylinder 6 (increase of pressure) and, in a closed position (FIG. 2b), prevents pressure medium being fed into the brake cylinder 6 (holding of pressure). Furthermore, the outlet diaphragm valve 14b, in an open position (FIG. 2b), connects the brake cylinder 6 to a pressure sink 30, R (reduction of pressure) and, in a closed position (FIG. 2a), blocks the connection between the brake cylinder 6 and the pressure sink 30, R (holding of pressure).

Figure 3:
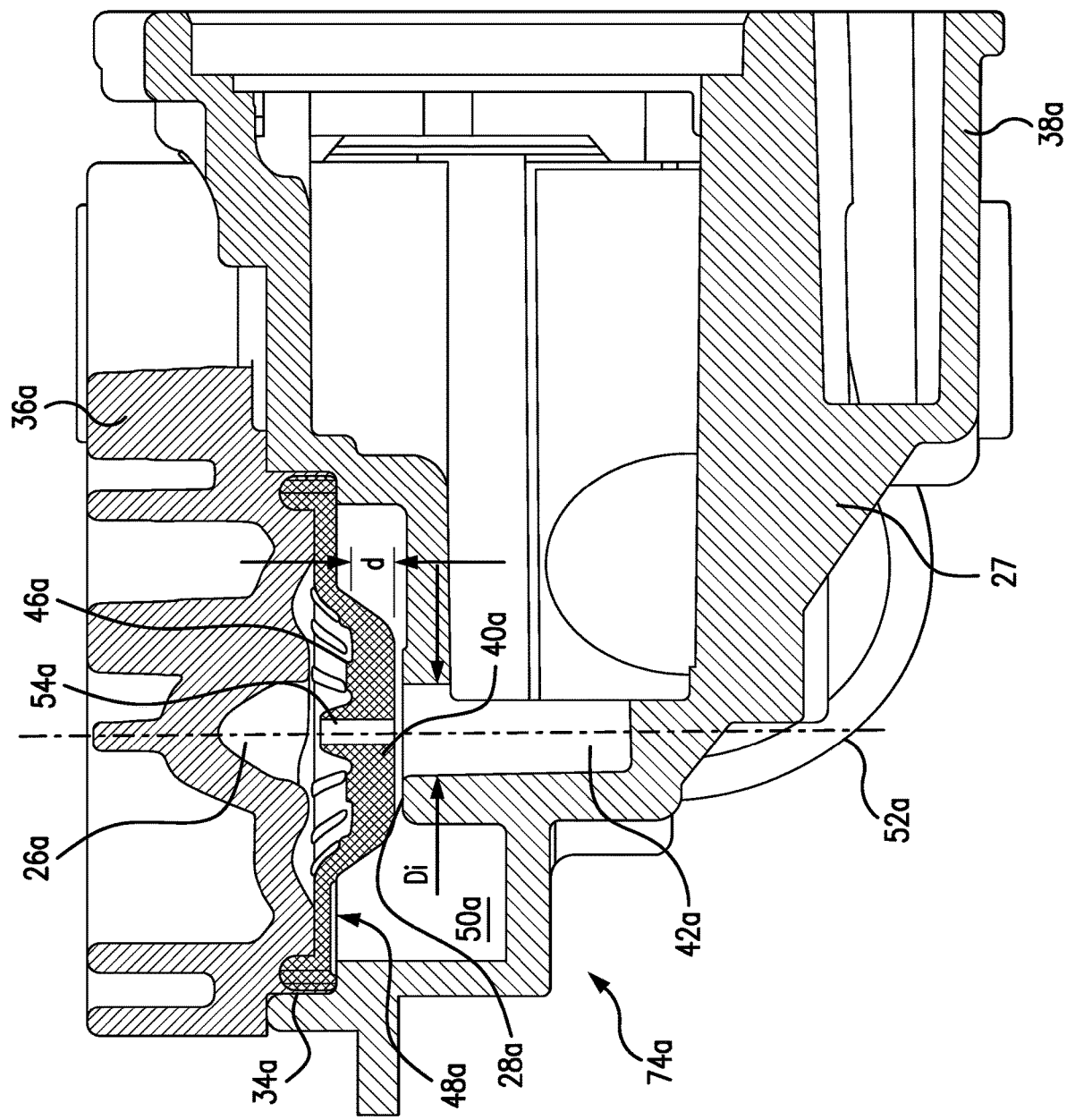

In FIG. 3, the diaphragm valves 14a provided as an inlet or holding valve of the pressure control valve arrangement 7 is illustrated in more detail and more specifically. The elastomer diaphragm 18a thereof has a radially outer edge bead 34a, which may be held in the housing 21 in that the radially outer edge bead 34a is clamped between an outer valve cover 36a and a valve housing main body 38a of the valve housing 21. The valve housing 21, which accommodates the valves 14a, 14b, 15a, 15b, therefore contains the valve housing main body 38a and the outer valve covers 36a, 36b which cap the diaphragm valves 14a, 14b.

The central region 40a of the elastomer diaphragm 18a interacts with the diaphragm valve seat 28a of a pressure medium flow channel 42a of the diaphragm valve 14a. Here, the diaphragm valve seat 28a is formed for example on the edge side at one end of the pressure medium flow channel 42a, the latter having an inner diameter Di. Furthermore, provision is made of the first control chamber 26a of the diaphragm seat valve 14a, which first control chamber is delimited by a first surface 46a, facing away from the diaphragm valve seat 28a, of the elastomer diaphragm 18a and by the valve cover 36a and is able to be loaded and relieved of load by pressure medium, wherein, when the first control chamber 26a is loaded by pressure medium, the elastomer diaphragm 18a is pushed against the diaphragm valve seat 28a. Furthermore, provision is also made of a second control chamber 50a, which is delimited by the second surface 48a, facing away from the first surface 46a, of the elastomer diaphragm 18a and by the valve housing main body 38a and is able to be loaded and relieved of load by pressure medium and, at least at one end side, surrounds the diaphragm valve seat 20a and the pressure medium flow channel 42a, wherein, when the second control chamber 50a is loaded by pressure medium, the elastomer diaphragm 18a has the tendency to lift off from the diaphragm valve seat 28a and in the process the second control chamber 50a is connected to the pressure medium flow channel 42a. This situation is also illustrated in FIG. 2a in connection with the "increase of pressure" state and is described in detail above.

The spring element 16a which pushes the central region 40a of the elastomer diaphragm 18a against the diaphragm valve seat 20a as a result of spring forces can be seen most clearly in FIG. 2a. Said spring element 16a may be configured such that it pushes the central region 40a of the elastomer diaphragm 18a against the diaphragm valve seat 28a with a relatively small force, which is just sufficient to define a starting state and a starting position of the elastomer diaphragm 18a, if no actuation by pressure medium is present. Alternatively, it is also possible to dispense with such a spring element 16a.

The pressure medium flow channel 42a, the diaphragm valve seat 28a and the elastomer diaphragm 18a are arranged coaxially with respect to an axial direction or central axis 52a, this also constituting an actuation direction of the elastomer diaphragm 18a in order for example to lift said elastomer diaphragm off from the diaphragm valve seat 28a. Elastomer diaphragm 18a means that the diaphragm may be produced completely from an elastomer and is therefore elastic and flexible.

With the holding or inlet diaphragm valve 14a of the pressure control valve arrangement 7, the first control chamber 26a is then connected to an output of the electromagnetic pilot control valve 15a, which forms the inlet pilot control valve. Furthermore, the second control chamber 50a is connected to a pneumatic channel of the service brake valve 9, and the pressure medium flow channel 42a is connected to the pressure medium-actuated brake cylinder 6 (FIG. 2a and FIG. 2c).

It is furthermore provided that an inner diameter Di of the pressure medium flow channel 42a is 7.5 mm to 9.5 mm, and the Shore hardness of the elastomer diaphragm 18a is at least 40 Shore A, and the smallest thickness d of the elastomer diaphragm 18a, at least in the central region 40a, which, as seen in relation to a radial direction perpendicular to the axial direction, is situated within the diaphragm valve seat 28a, is at least 30% of the inner diameter Di of the pressure medium flow channel 42a. The central region 40a of the elastomer diaphragm 18a may also have, as shown in FIG. 3, a prominent centering pin 54a, which is prominent in relation to the first control chamber 26a and at which one end of the spring element 16a, which may be in the form of a helical compression spring, is centered. The other end of the spring element 16a is however centered or supported in a formation of the first control chamber 26a. The spring element 16a may be likewise coaxial with respect to the central axis.

The applicant of the present patent application, indeed, has found out that then, on the one hand, the stiffness in relation to material and shape of the elastomer diaphragm 18a, in particular in the central region 40a, which, as seen in relation to a radial direction perpendicular to the axial direction, is situated within the diaphragm valve seat 28a, is high enough, and on the other hand, the inner diameter Di of the pressure medium flow channel 42a is small enough, that, under the normal pressure conditions for pressure control valve arrangements 7, the elastomer diaphragm 18a does not buckle, or break, into the pressure medium flow channel 42a. However, in the radially outer region of the elastomer diaphragm 18a too, owing to the relatively high stiffness of the elastomer material, a stiffness of such a magnitude is provided that the elastomer diaphragm 18a neither breaks nor buckles there. In this way, a high service life and also a high level of functional reliability of the elastomer diaphragm 18a are ensured.

In particular, the elastomer diaphragm 18a of the diaphragm valve 14a is formed without an additional support ring, of which provision is made for example for supporting the radially outer region of the elastomer diaphragm 18a. Furthermore, the elastomer diaphragm 18a of the diaphragm valve 14a is also formed without an additional support plate, integrated for example in the central region 40a of the elastomer diaphragm 18a, wherein the support ring and the support plate are produced from a material which differs from an elastomer, and for example from a metal, as described for example in the aforementioned DE 10 2008 035 372 A1. This results in a considerable reduction in the manufacturing costs of the diaphragm valve 14a.

According to an embodiment not shown here, it is also the case that the outlet diaphragm valve 14b is formed like the inlet or holding diaphragm valve 14a according to FIG. 3, wherein however, in this case, the first control chamber 26b is connected to an output of the electromagnetic pilot control valve 15b (outlet valve). Furthermore in this case, the second control chamber 50b is connected to the pressure medium-actuated brake cylinder 6, and the pressure medium flow channel 42b is connected to the pressure sink R or 30. Analogous or identical components of the outlet diaphragm valve 14b are, just like for the inlet or holding diaphragm valve 14a, denoted by the same reference signs, wherein then, the letter b is set instead of the letter a (FIG. 2c). The function of the outlet diaphragm valve 14b emerges from the above description in relation to FIG. 2b.

THE LIST OF REFERENCE SIGNS IS AS FOLLOWS

1 Front axle
2 Rear axle
3 Wheel
4 Wheel
5 Rotational speed sensor
6 Brake cylinder
7 Pressure control valve arrangement
8 Brake pressure line
9 Foot brake valve
10 Control unit
11 ASR unit
12 ASR solenoid valve
13 Shuttle valve
14a/b Diaphragm valve
15a/b Electromagnetic valve
16a/b Spring element
17a/b Spring element
18a/b Elastomer diaphragm
19a/b Magnet coils
20a/b Solenoid valve seats
21 Housing 22a/b Magnet armature
23 Pressure medium port
24 Working port
26a/b First control chamber
27a/b Pressure sink
28a/b Diaphragm valve seat
29a/b Solenoid valve seat
30 Pressure sink
31 Bypass channel
32 Arrow
34a/b Edge bead
36a/b Valve cover
38a Valve housing main body
40a/b Central region
42a/b Pressure medium flow channel
46a/b First surface
48a/b Second surface
50a/b Second control chamber
52a/b Central axis
54a/b Centering pin
Di Inner diameter
d Thickness
R Pressure medium reservoir

The invention claimed is:

1. A diaphragm valve, comprising:
an elastomer diaphragm, which is held in or on a valve housing via a radially outer edge bead and interacts with a diaphragm valve seat;
a first control chamber, which is delimited by a first surface, facing away from the diaphragm valve seat, of the elastomer diaphragm and is able to be loaded and relieved of load by a pressure medium, wherein, when the first control chamber is loaded by the pressure medium, the elastomer diaphragm is pushed against the diaphragm valve seat;
a second control chamber, which is delimited by a second surface, facing away from the first surface, of the elastomer diaphragm and is able to be loaded and relieved of load by the pressure medium and surrounds the diaphragm valve seat, wherein, when the second control chamber is loaded by the pressure medium, the elastomer diaphragm has the tendency to lift off from the diaphragm valve seat and in the process the second control chamber is connected to a pressure medium flow channel, on which the diaphragm valve seat is formed at an end side;
wherein the pressure medium flow channel, the diaphragm valve seat and the elastomer diaphragm are arranged in a manner coaxial with one another with respect to an axial direction,
wherein an inner diameter of the pressure medium flow channel is 7.5 mm to 9.5 mm,
wherein the Shore hardness of the elastomer diaphragm is at least 40 Shore A, and
wherein the smallest thickness of the elastomer diaphragm in a central region of the elastomer diaphragm, which central region, as seen in relation to a radial direction perpendicular to the axial direction, is situated within the diaphragm valve seat, is at least 30% of the inner diameter of the pressure medium flow channel.

2. The diaphragm valve of claim 1, wherein the elastomer diaphragm is formed without an additional support ring, of which provision is made for supporting a radially outer region of the elastomer diaphragm, and/or without an additional support plate, integrated in the central region of the elastomer diaphragm, wherein the support ring and the support plate are produced from a material which differs from an elastomer.

3. The diaphragm valve of claim 1, further comprising:
spring devices which push the central region of the elastomer diaphragm against the valve seat as a result of spring forces.

4. The diaphragm valve of claim 1, wherein the pressure medium is formed by compressed air or by hydraulic fluid.

5. The diaphragm valve of claim 1, wherein the first control chamber and the second control chamber are additionally delimited by the valve housing.

6. A pressure control valve arrangement for controlling a fluid pressure in a pressure medium-actuated and slip-regulated brake system of a vehicle, in which, during the slip regulation, the brake pressure is increased, held or reduced in at least one brake cylinder, comprising:
a holding or inlet diaphragm valve and an outlet diaphragm valve, and also two electromagnetic pilot control valves which are able to be activated by an electronic control device and which serve for the pilot control of the diaphragm valves are in a housing of the pressure control valve arrangement;
wherein the holding or inlet diaphragm valve, in an open position, passes a pressure medium through into the at least one brake cylinder and, in a closed position, prevents the pressure medium being fed into the at least one brake cylinder,
wherein the outlet diaphragm valve, in an open position, connects the at least one brake cylinder to a pressure sink and, in a closed position, blocks the connection between the at least one brake cylinder and the pressure sink,
wherein of the holding or inlet diaphragm valve and the outlet diaphragm valve, at least the holding or inlet diaphragm valve is formed by a diaphragm valve, which includes:
an elastomer diaphragm, which is held in or on a valve housing via a radially outer edge bead and interacts with a diaphragm valve seat;
a first control chamber, which is delimited by a first surface, facing away from the diaphragm valve seat, of the elastomer diaphragm and is able to be loaded and relieved of load by the pressure medium, wherein, when the first control chamber is loaded by the pressure medium, the elastomer diaphragm is pushed against the diaphragm valve seat;
a second control chamber, which is delimited by a second surface, facing away from the first surface, of the elastomer diaphragm and is able to be loaded and relieved of load by the pressure medium and surrounds the diaphragm valve seat, wherein, when the second control chamber is loaded by the pressure medium, the elastomer diaphragm has the tendency to lift off from the diaphragm valve seat and in the process the second control chamber is connected to a pressure medium flow channel, on which the diaphragm valve seat is formed at an end side;
wherein the pressure medium flow channel, the diaphragm valve seat and the elastomer diaphragm are arranged in a manner coaxial with one another with respect to an axial direction, wherein an inner diameter of the pressure medium channel is 7.5 mm to 9.5 mm,
wherein the Shore hardness of the elastomer diaphragm is at least 40 Shore A, and wherein the smallest thickness of the elastomer diaphragm in a central region of the elastomer diaphragm, which central region, as seen in relation to a radial direction perpendicular to the axial direction, is situated within the diaphragm valve seat, is at least 30% of the inner diameter of the pressure medium channel.

7. The pressure control valve arrangement of claim 6, wherein the first control chamber of the holding or inlet diaphragm valve is connected to an output of an electromagnetic pilot control valve, which forms an inlet pilot control valve, and in that the second control chamber of the holding or inlet diaphragm valve is connected to a pneumatic channel of a service brake valve, and the pressure medium flow channel of the holding or inlet diaphragm valve is connected to the at least one pressure medium-actuated brake cylinder.

8. The pressure control valve arrangement of claim 6, wherein the outlet diaphragm valve is formed by another diaphragm valve, which includes:
   an elastomer diaphragm, which is held in or on a valve housing via a radially outer edge bead and interacts with a diaphragm valve seat;
   a first control chamber, which is delimited by a first surface, facing away from the diaphragm valve seat of the outlet diaphragm valve, of the elastomer diaphragm and is able to be loaded and relieved of load by a pressure medium, wherein, when the first control chamber is loaded by the pressure medium, the elastomer diaphragm is pushed against the diaphragm valve seat;
   a second control chamber, which is delimited by a second surface of the outlet diaphragm valve, facing away from the first surface of the first control chamber, of the elastomer diaphragm of the outlet diaphragm valve and is able to be loaded and relieved of load by the pressure medium and surrounds the diaphragm valve seat, wherein, when the second control chamber of the outlet diaphragm valve is loaded by the pressure medium, the elastomer diaphragm has the tendency to lift off from the diaphragm valve seat and in the process the second control chamber is connected to a pressure medium flow channel of the outlet diaphragm valve, on which the diaphragm valve seat is formed at an end side;
   wherein the pressure medium flow channel, the diaphragm valve seat and the elastomer diaphragm are arranged in a manner coaxial with one another with respect to an axial direction, wherein an inner diameter of the pressure medium channel is 7.5 mm to 9.5 mm,
   wherein the Shore hardness of the elastomer diaphragm is at least 40 Shore A, and
   wherein the smallest thickness of the elastomer diaphragm in a central region of the elastomer diaphragm, which central region, as seen in relation to a radial direction perpendicular to the axial direction, is situated within the diaphragm valve seat, is at least 30% of the inner diameter of the pressure medium channel.

9. The pressure control valve arrangement of claim 8, wherein the first control chamber of the outlet diaphragm valve is connected to an output of at least one of the electromagnetic pilot control valves, which form an outlet pilot control valve, and in that the second control chamber of the outlet diaphragm valve is connected to the at least one pressure medium-actuated brake cylinder, and the pressure medium flow channel of the outlet diaphragm valve is connected to the pressure sink or to a pressure medium reservoir.

10. The pressure control valve arrangement of claim 6, wherein each of the two electromagnetic pilot control valves has a magnet coil and magnet armatures which interact with solenoid valve seats and which are actuatable counter to a spring device by electrical energization of the magnet coils.

11. A slip-regulated, pressure medium-actuated brake system of a vehicle, comprising:
   at least one pressure control valve device, wherein, during the slip regulation, the brake pressure is increased, held or reduced in at least one brake cylinder;
   wherein the pressure control valve device includes:
      two diaphragm valves, including a holding or inlet diaphragm valve and an outlet diaphragm valve, and also two electromagnetic pilot control valves which are able to be activated by an electronic control device and which serve for the pilot control of the diaphragm valves are in a housing of the pressure control valve arrangement;
      wherein the holding or inlet diaphragm valve, in an open position, passes a pressure medium through into the at least one brake cylinder and, in a closed position, prevents the pressure medium being fed into the at least one brake cylinder,
      wherein the outlet diaphragm valve, in an open position, connects the at least one brake cylinder to a pressure sink and, in a closed position, blocks the connection between the at least one brake cylinder and the pressure sink,
      wherein of the holding or inlet diaphragm valve and the outlet diaphragm valve, at least the holding or inlet diaphragm valve is formed by a diaphragm valve, and
      wherein the diaphragm valve includes:
         an elastomer diaphragm, which is held in or on a valve housing via a radially outer edge bead and interacts with a diaphragm valve seat;
         a first control chamber, which is delimited by a first surface, facing away from the diaphragm valve seat, of the elastomer diaphragm and is able to be loaded and relieved of load by the pressure medium, wherein, when the first control chamber is loaded by the pressure medium, the elastomer diaphragm is pushed against the diaphragm valve seat;
         a second control chamber, which is delimited by a second surface, facing away from the first surface, of the elastomer diaphragm and is able to be loaded and relieved of load by the pressure medium and surrounds the diaphragm valve seat, wherein, when the second control chamber is loaded by the pressure medium, the elastomer diaphragm has the tendency to lift off from the diaphragm valve seat and in the process the second control chamber is connected to a pressure medium flow channel, on which the diaphragm valve seat is formed at an end side;
         wherein the pressure medium flow channel, the diaphragm valve seat and the elastomer diaphragm are arranged in a manner coaxial with one another with respect to an axial direction, wherein an inner diameter of the pressure medium channel is 7.5 mm to 9.5 mm,
         wherein the Shore hardness of the elastomer diaphragm is at least 40 Shore A, and
         wherein the smallest thickness of the elastomer diaphragm in a central region of the elastomer diaphragm, which central region, as seen in relation to a radial direction perpendicular to the axial direction, is situated within the diaphragm valve seat, is at least 30% of the inner diameter of the pressure medium channel.

12. The diaphragm valve of claim 1, wherein a bypass channel bypasses a flow cross section closed off by a magnet armature, which bears sealingly against a solenoid valve seat, and allows a compressed air flow along at least one part of a magnet coil.

13. The diaphragm valve of claim 12, wherein the bypass channel is formed, with respect to its cross section, such that a volume flow of the compressed air flow through the bypass channel is smaller than an upper limit volume flow by which the holding or inlet diaphragm valve is switchable from its closed position back into its open position.

* * * * *